US010614633B2

(12) United States Patent
Schuneman et al.

(10) Patent No.: US 10,614,633 B2
(45) Date of Patent: Apr. 7, 2020

(54) PROJECTING A TWO-DIMENSIONAL IMAGE ONTO A THREE-DIMENSIONAL GRAPHICAL OBJECT

(71) Applicant: MICROSOFT TECHNOLOGY LICENSING, LLC, Redmond, WA (US)

(72) Inventors: Lee Jason Schuneman, London (GB); Mark Aaron Stanley, Worthing (GB); David Mondelore, London (GB); Jonathan Peter Creighton, London (GB); Alexander Charles Cullum, Maidenhead (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 15/382,204

(22) Filed: Dec. 16, 2016

(65) Prior Publication Data

US 2018/0108183 A1 Apr. 19, 2018

Related U.S. Application Data

(60) Provisional application No. 62/409,740, filed on Oct. 18, 2016.

(51) Int. Cl.

| | |
|---|---|
| ***G06T 19/20*** | (2011.01) |
| ***G06F 3/0481*** | (2013.01) |
| ***G06T 15/04*** | (2011.01) |

(52) U.S. Cl.

CPC ............ *G06T 19/20* (2013.01); *G06F 3/0481* (2013.01); *G06F 3/04815* (2013.01);

(Continued)

(58) Field of Classification Search

CPC .. G06F 17/50; G06F 2217/02; G06F 3/04815; G06F 3/04845; G06F 3/04847;

(Continued)

(56) References Cited

U.S. PATENT DOCUMENTS

| | | | | |
|---|---|---|---|---|
| 5,903,270 | A | 5/1999 | Gentry et al. | |
| 8,866,841 | B1 * | 10/2014 | Distler .................... | G06T 11/60 345/619 |
| 2011/0306417 | A1 | 12/2011 | Sheblak et al. | |
| 2013/0162633 | A1 * | 6/2013 | Berger .................... | G06T 15/04 345/419 |
| 2014/0078144 | A1 * | 3/2014 | Berriman ................ | A63F 13/10 345/426 |

(Continued)

OTHER PUBLICATIONS

Adobe Photoshop Help and Tutorials. Feb. 2013, help.adobe.com/archive/en/photoshop/cs6/photoshop_reference.pdf (Year: 2013).*

(Continued)

*Primary Examiner* — Xiao M Wu
*Assistant Examiner* — Scott E Sonners
(74) *Attorney, Agent, or Firm* — Shook, Hardy & Bacon L.L.P.

(57) ABSTRACT

Aspects of the technology described herein provide for projecting a two-dimensional (2D) image onto a surface of a three-dimensional (3D) graphical object within a virtual 3D drawing space. In response to a user input indicating a command to stamp the 2D image onto the 3D graphical object, the 2D image is projected, in 3D space, onto the surface of the 3D graphical object, creating the appearance that the 2D image wraps around the 3D graphical object in 3D space. In one aspect, as the 3D graphical object is rotated, translated, stretched, or otherwise manipulated, the 2D image remains fixed to the surface of the 3D graphical object and is also rotated, translated, stretched, or otherwise manipulated.

20 Claims, 18 Drawing Sheets

1200

SELECTION

100% - + 3D

(52) U.S. Cl.
CPC .... *G06T 15/04* (2013.01); *G06F 2203/04802* (2013.01); *G06T 2200/24* (2013.01); *G06T 2210/12* (2013.01); *G06T 2219/2016* (2013.01)

(58) Field of Classification Search
CPC ......... G06T 11/00; G06T 11/60; G06T 19/20; G06T 3/40; G06T 15/04; G06T 15/10; G06T 2200/24; G06T 2219/2021; A63F 2300/308; A63F 2300/6009
See application file for complete search history.

(56) References Cited

U.S. PATENT DOCUMENTS

2014/0104266 A1 4/2014 Stone et al.
2015/0040074 A1 2/2015 Hofmann et al.
2015/0206310 A1* 7/2015 Okada .................... G06T 3/40 348/222.1
2016/0379339 A1* 12/2016 Ho .................... G09G 5/02 345/427

OTHER PUBLICATIONS

TheMhoffman2001. “Wrap a 2D Image onto a 3D Cylinder in Photoshop.” YouTube, YouTube, May 27, 2014, www.youtube.com/watch?v=MfDVLc3ONRk (Year: 2014).*
Hoffman, Michael, “Wrap a 2D Image onto a 3D Cylinder in Photoshop”, https://www.youtube.com/watch?v=MfDVLc3ONRk, Published on: May 27, 2014, 4 pages.
“How to Apply 2D graphics to 3d Objects w/ Photoshop”, https://www.youtube.com/watch?v=k00KRYn_9iE, Published on: Jun. 25, 2012, 3 pages.
Noe, Rain, “Getting 2D Images onto 3D Shapes: Computational Thermoforming vs. Computational Hydro graphics”, http://www.core77.com/posts/55210/Getting-2D-Images-onto-3D-Shapes-Computational-Thermoforming-vs-Computational-Hydrographics, Retrieved on: Nov. 9, 2016, 9 pages.
Ross, Brian J., “3D Perspective”, http://web.archive.org/web/19990210055802/http:/www.cosc.brocku.ca/Offerings/3P98/course/lectures/3d_perspective/, Published on: Feb. 10, 1999, 7 pages.
“Computing the Pixel Coordinates of a 3D Point”, Na, Jan. 31, 2015, 5 pages.
“Create 3D objects and animations”, http://web.archive.org/web/20150912144316/https:/helpx.adobe.com/photoshop/using/creating-3d-objects-animations-photoshop.html, Published on: Sep. 12, 2015, 10 pages.
MacDonald, David, “Modeling in SketchUp to Match a 2D Image”, http://www.sketchupartists.org/tutorials/sketchup-and-photo-match/modeling-in-sketchup-to-match-a-2d-image/, Published on: Feb. 2010, 1-23 pages.
“UVW Map Modifier”, https://knowledge.autodesk.com/support/3ds-max/learn-explore/caas/CloudHelp/cloudhelp/2016/ENU/3DSMax/files/GUID-78327298-4741-470C-848D-4C3618B18FCA-htm.html, Published on: Feb. 8, 2016, 22 pages.

* cited by examiner

PROJECTING A TWO-DIMENSIONAL IMAGE ONTO A THREE-DIMENSIONAL GRAPHICAL OBJECT

CROSS-REFERENCE TO RELATED APPLICATIONS

This application claims priority to U.S. Provisional Application Ser. No. 62/409,740, filed Oct. 18, 2016, entitled "Projecting a Two-Dimensional Image onto a Three-Dimensional Graphical Object," the disclosure of which is hereby incorporated by reference in its entirety.

BACKGROUND

Traditionally, stamps or stickers in computer-aided design applications are "flat" in appearance. The stamps or stickers are two-dimensional, and when applied in a drawing environment, they are simply overlaid onto the existing background or objects in a two-dimensional fashion.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide for stamping or sticking a two-dimensional (2D) image onto a surface of a three-dimensional (3D) graphical object within a virtual 3D drawing space. In one aspect, the 2D image is projected, in 3D space, onto the surface of the 3D graphical object, creating the appearance that the 2D image wraps around the 3D graphical object in 3D space. Then, as the 3D graphical object is rotated, translated, stretched, or otherwise manipulated, the 2D image may remain fixed to the surface of the 3D graphical object and may also be rotated, translated, stretched, or otherwise manipulated.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are generally directed to systems, methods, and computer storage media that provide for, among other things, stamping or sticking a 2D image onto a surface of a 3D graphical object within a virtual 3D drawing space. In one aspect, the 2D image is projected, in 3D space, onto the surface of the 3D graphical object, creating the appearance that the 2D image wraps around the 3D graphical object in 3D space. Then, as the 3D graphical object is rotated, translated, stretched, or otherwise manipulated, the 2D image may remain fixed to the surface of the 3D graphical object and may also be rotated, translated, stretched, or otherwise manipulated.

Figure 1:
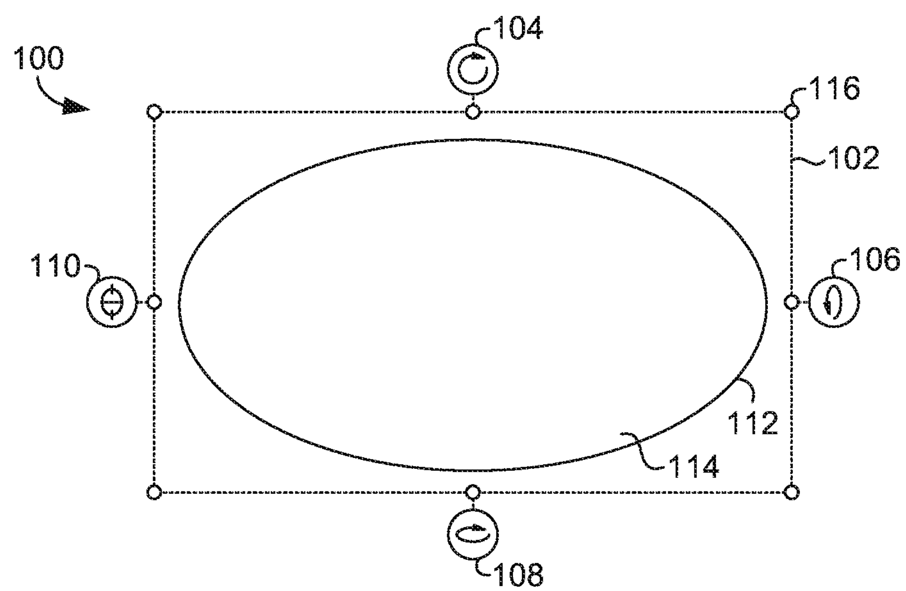
FIG. 1 shows a view of a 3D object, in accordance with aspects of the present disclosure.

Turning now to FIG. 1, a view 100 of a 3D graphical object 112 having a surface 114 is provided. The view 100 may be provided in the context of a user interface for a virtual 3D drawing space that is generated by a computer, such as within a 3D drawing application. The object 112 may be created via a user input provided to a 3D drawing application.

Surrounding the object 112 is a bounding box 102. The bounding box 102 includes four control handles. Control handle 104 is used to rotate the object 112 around a z-axis. Control handle 106 is used to rotate the object 112 around an x-axis. Control handle 108 is used to rotate the object 112 around the y-axis.

Control handle 110 is a depth controller that can change an object's depth within the virtual drawing space. In one example, the depth of an object corresponds to the z-value of the object's centroid. Increasing the z value of the centroid can be described as moving the object forward towards the viewer. Decreasing the z value of the centroid can be described as moving the object backwards away from the viewer.

In one aspect, upon selecting the depth controller 110, the camera view changes to look down on the object 112. A track or line oriented in parallel to the z-axis can appear below the controller 110 and the user can change the depth of the object 112 by sliding the control towards the viewer or away from the viewer along the track. In one aspect, an x-y coordinate plane that intersects the centroid of the object 112 is displayed upon activation of the controller 110. The plane can move as the object 112 moves to help the user compare the depth of the object 112 to the depth of other objects in the virtual drawing space.

The bounding box 102 may be used to resize the object 112. For example, a plurality of size controls, including size control 116, on the bounding box may be used to increase or decrease the size of the object 112 in any direction. For example, as a user drags the size control 116 (or any other size control) toward the center of the object 112, the object decreases in size, and as the user drags the size control 116

(or any other size control) away from the object 112, the object increases in size. The object 112 may be resized proportionately (i.e. it may retain its original proportions) or disproportionately (i.e. it may be stretched further in one direction, such as the x direction, than in another direction, such as the y direction).

Figure 2:
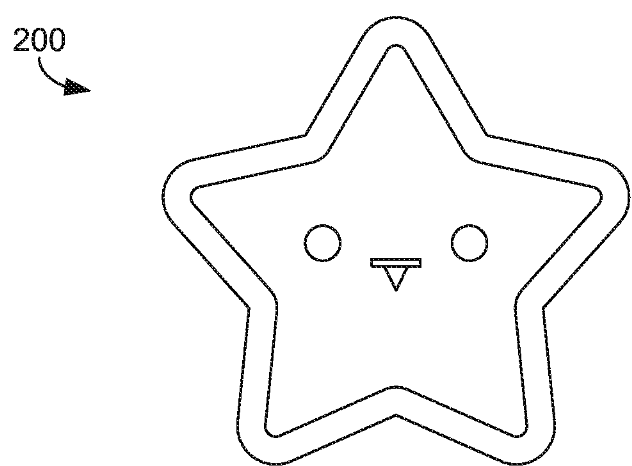
FIG. 2 shows a view of a sticker tool, in accordance with aspects of the present disclosure.

Turning now to FIG. 2, a sticker tool 200 is shown. The sticker tool 200 allows a user to apply a sticker to the surface of any 2D or 3D object. The sticker may be any 2D image. In some instances, the sticker is a predefined sticker. For example, a drawing application may provide a number of predefined stickers from which a user may choose. In other instances, the user may designate the object that is to be used as the sticker. For example, the user may turn any two-dimensional image, including shapes, objects, or other images provided by the drawing application, into a sticker. In some examples, the sticker is a texture that is applied to the surface of an object. The user may also turn user-provided content into a sticker. For example, a user may upload or otherwise import an image, such as a photograph, and use the user-provided image as a sticker. In some instances, the user may select a portion of the image that is to be used as a sticker, such as by cropping the image or otherwise designating the portion that is to be used as a sticker. These features are discussed in more detail below.

The sticker tool 200 may be used to provide a sticker or stamping effect within the 3D virtual drawing space. Specifically, the sticker tool 200 may be used to stick, stamp, or overlay an image onto the 3D virtual drawing space, similar to the way in which a physical stamp or sticker may be used on a physical drawing surface.

Figure 3:
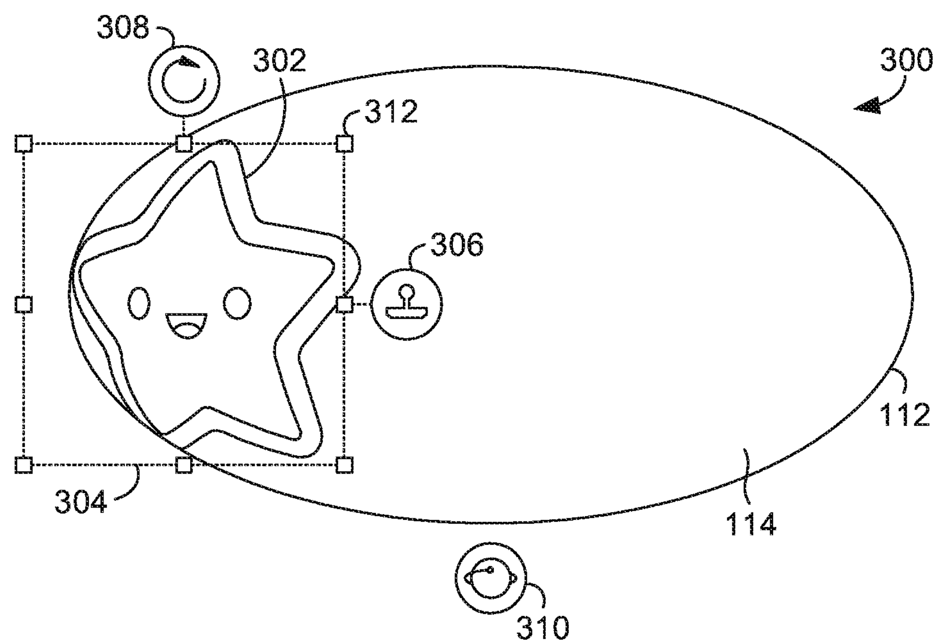
FIG. 3 shows a view of a sticker that has been applied to the surface of the 3D object, in accordance with aspects of the present disclosure.

In one example, in order to apply a sticker within the 3D virtual drawing space, a user may select the sticker tool 200. Upon selecting the sticker tool 200, an image of a sticker may be presented within a user interface for a drawing application. The user may navigate the sticker to a desired location within the user interface of the drawing application, such as over a portion of a 3D object. For example, FIG. 3 provides a view 300 of a sticker 302 that has been positioned over a portion of the object 112. The user may then apply the sticker 302 to the surface 114 of the object 112 by selecting the stamp control 306. When applied, the sticker is projected, in 3D space, onto the 3D object 112. This creates the appearance that the sticker 302 is wrapped around the 3D object 112.

Figure 4:
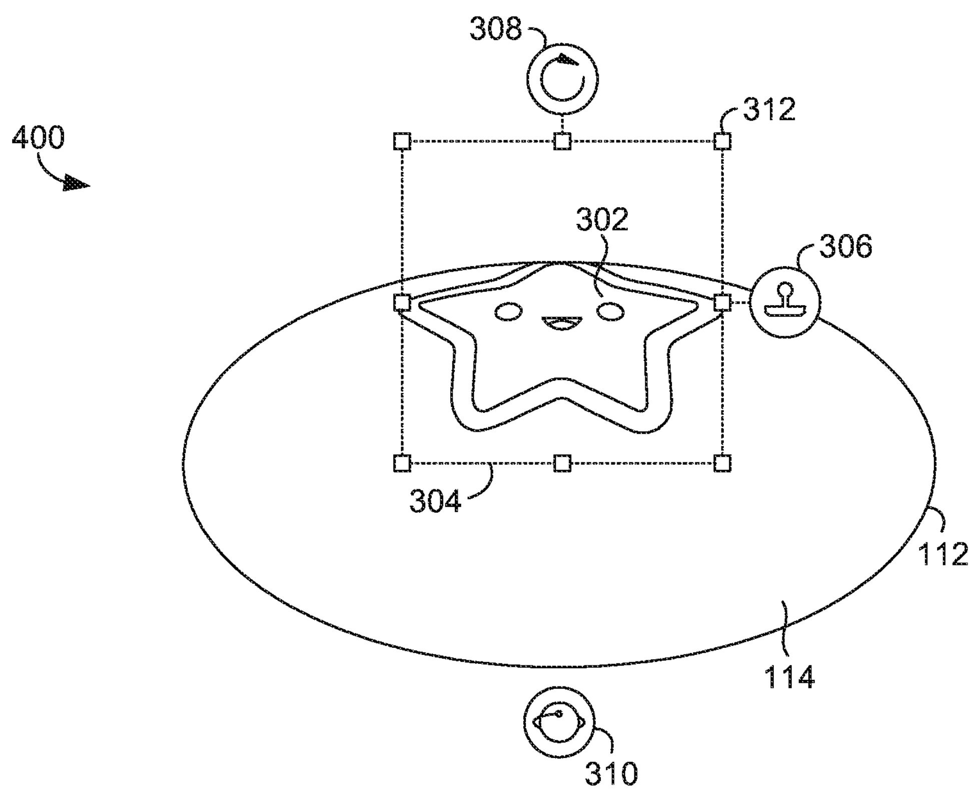
FIG. 4 shows a view of the 3D object and the sticker of FIG. 3 after the 3D object has been rotated, in accordance with aspects of the present disclosure.

Once applied to the surface 114 of the object 112, the sticker 302 may behave as if it is adhered to and/or painted onto the surface 114 of the object 112. Thus, as the object 112 is rotated, translated, stretched, or otherwise manipulated in space, the sticker 302 may rotate, translate, stretch, or otherwise move, accordingly. For example, in view 400 provided in FIG. 4, the object 112 has been rotated. As shown, the sticker 302 has rotated along with the object, as if the sticker 302 is adhered to the surface 114 of the object 112. In another example, if the object 112 was stretched along an x-axis passing through the center of mass of the object 112, the sticker 302 may be stretched proportionately along the same axis, again, behaving as if it is adhered to and/or painted onto the surface 114 of the object 112.

As mentioned, upon selecting the sticker tool 200, an image of the sticker 302 may be presented within the drawing application. The user may then move the sticker 302 around the user interface of the drawing application before applying the sticker 302. As the user moves the sticker 302, the drawing application may provide a preview of how the sticker will look if applied at any given position within the user interface. For example, as the user moves the sticker over a first area of the object 112, the drawing application may present a projection of the sticker 302 over the first area. When the user then moves the sticker 302 over a second area of the 3D object, the drawing application may present a projection of the sticker 302 over the second area. Accordingly, as the user moves the sticker 302 around the user interface, the drawing application may present a projection of the sticker 302 over various areas and objects included in the user interface.

Additionally, upon selecting the sticker tool 200, a bounding box 304 may be presented around the image of the sticker 302. In the examples provided in FIGS. 3-4, the bounding box includes two control handles. Control handle 308 is used to rotate the sticker 302 in a clockwise or counterclockwise direction. As will be discussed below, in other examples, additional control handles facilitate manipulating the sticker 302. Control handle 308 may be used to rotate the sticker 302 prior to applying the sticker in the virtual 3D drawing space. In some aspects, control handle 308 may be used to rotate the sticker 302 even after it has been applied, while in other aspects, the sticker 302 may be locked after it has been applied such that it may no longer be rotated using control handle 308. The locking feature may prevent a user from inadvertently rotating the sticker 302 after it has been applied. Control handle 306 is used to apply the sticker 302 at a particular position within the drawing application. For example, a user may navigate the sticker 302 to a desired position on the object 112 and then select the control handle 306 to apply the sticker to the surface 114 of the object 112. As discussed above, once applied to the surface 114 of the object 112, the sticker 302 may behave as if it is adhered to and/or painted onto the surface 114 of the object 112.

The bounding box 304 may also be used to resize the sticker 302. For example, a plurality of size controls, including size control 312, on the bounding box may be used to increase or decrease the size of the sticker 302 in any direction. For example, as a user drags the size control 312 (or any other size control) toward the center of the sticker 302, the sticker decreases in size, and as the user drags the size control 312 (or any other size control) away from the sticker 302, the sticker increases in size. The sticker 302 may be resized proportionately (i.e. it may retain its original proportions) or disproportionately (i.e. it may be stretched further in one direction, such as the x direction, than in another direction, such as the y direction). In some aspects, the resizing functionality of the bounding box 304 may be used to resize the sticker 302 even after it has been applied, while in other aspects, the sticker 302 may be locked after it has been applied such that it may no longer be resized using the resizing functionality of the bounding box 304. The locking feature may prevent a user from inadvertently resizing the sticker 302 after it has been applied.

Control handle 310 facilitates the manipulation of the object 112 in 3D space. For example, the rotation of the object 112 between FIG. 3 and FIG. 4 may be accomplished via the control handle 310. Thus, the control handle 310 may be used to rotate the object 112 around multiple different axes. For example, the control handle 310 may serve as a single input mechanism for rotating the object 112 around the x-, y-, and/or z-axis. Accordingly, the functionality provided by control handle 310 may be similar to the functionality provided by control handles 104, 106, and/or 108, discussed above with respect to FIG. 1. In one example, control handle 310 enables a user to rotate the object around an x-axis via an up/down input (e.g., via a cursor) and around a y-axis via a left/right input (e.g., via a cursor). In some instances, the control handle 310 may be called an "Orbit" control.

Although the above discussion focuses on the application of a 2D image (e.g., a sticker) to a 3D object, aspects of the technology described herein also provide for applying a 2D image to the surface of 2D objects. For example, a 2D image may be projected onto the surface of a 2D object. As described above, the 2D image may then behave as if it is adhered to and/or painted onto the surface of the 2D object. Accordingly, as the 2D object is rotated, translated, stretched, or otherwise manipulated, the 2D image may remain fixed to the surface of the 2D object and may also be rotated, translated, stretched, or otherwise manipulated.

Turning now to FIGS. 5-18, various exemplary user interfaces associated with a virtual drawing space, such as a drawing application, are illustrated. At a high level, the drawing application may provide several features for manipulating 2D images. Two exemplary features are the "Make Object" command and the "Sticker Object" command. It is understood that these command names are exemplary only. For example, the "Make Object" command might also be called "Make 3D" or any other name. Similarly, the "Sticker Object" command might also be called "Make Sticker" or any other name. The "Make Object" command causes a 2D image to be turned into an object, such as a 2D object or a flat 3D object. For example, the 2D image may be rasterized to a floating quad. This may include turning a selected image into a floating rectangle that can be scaled, positioned, and rotated in 3D space. Additionally or alternatively, a selection on a surface may be pulled or peeled off of that surface into its own flat floating surface, in the shape of a quad, mimicking the shape of the selection. The shape of the selection may be arbitrary, in which case the floating surface may also be arbitrary. In this way, the resolution and rasterization of the floating surface may be identical to the original surface. The virtual 3D drawing space may include multiple different objects—both 2D and 3D—and the 2D image that is the subject of the "Make Object" command may become one of these objects. The 2D image that is the subject of the "Make Object" command may then be moved (along an x-, y-, and/or z-axis of the drawing space), rotated, or otherwise manipulated like other objects in the 3D drawing space.

By contrast, the "Sticker Object" command causes a 2D image to be converted to a sticker template, which may then be stamped or otherwise applied to the scene in the 3D drawing space. For example, the 2D image that is the subject of the "Sticker Object" command may be rasterized to a background (which may be referred to as a "canvas") in the 3D drawing space or to another object (2D or 3D) in the 3D drawing space. These features are discussed in more detail below.

Figure 5:
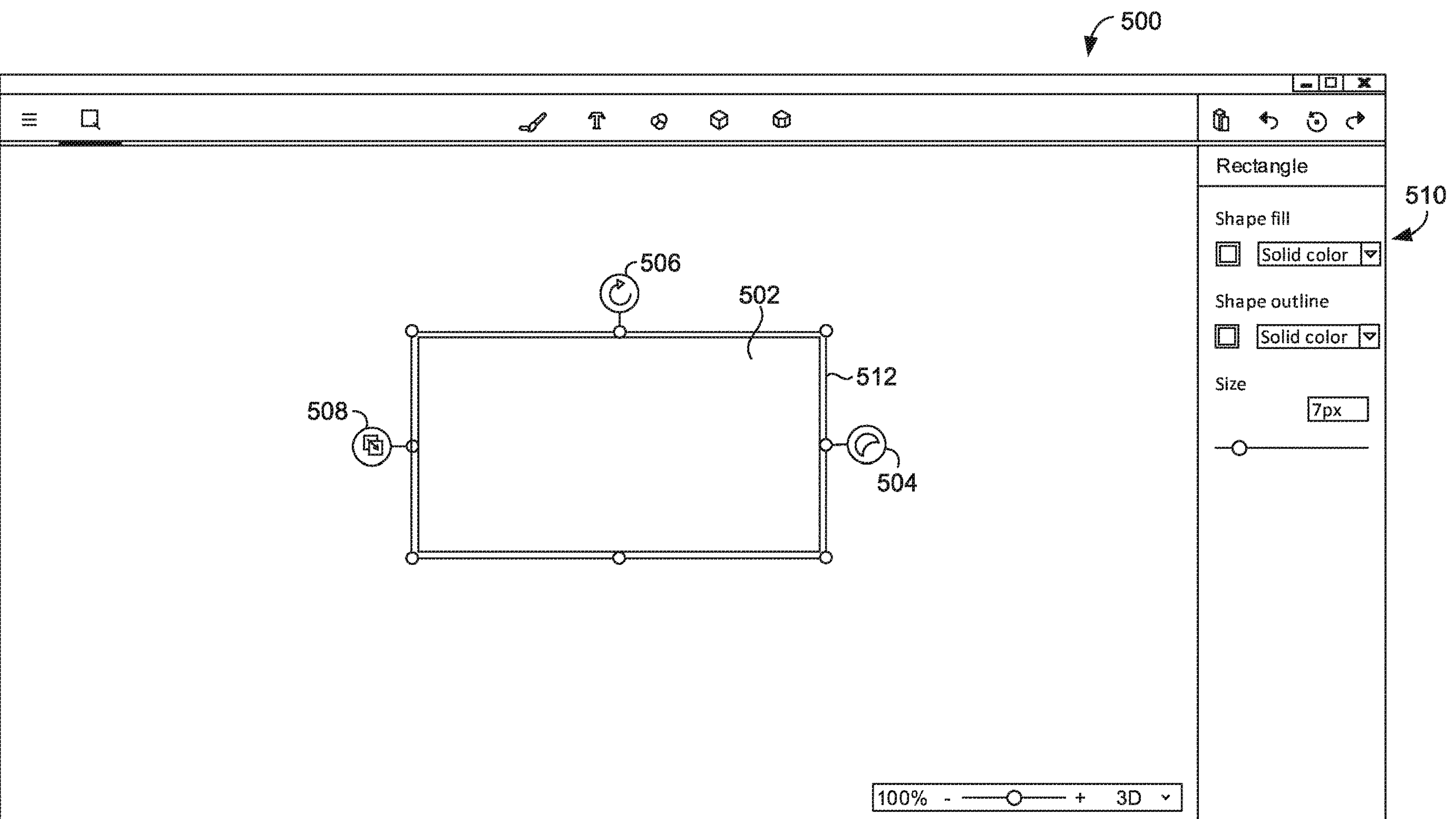
FIGS. 5-18, show user interfaces associated with a virtual drawing space, in accordance with aspects of the present disclosure.
Figure 6:
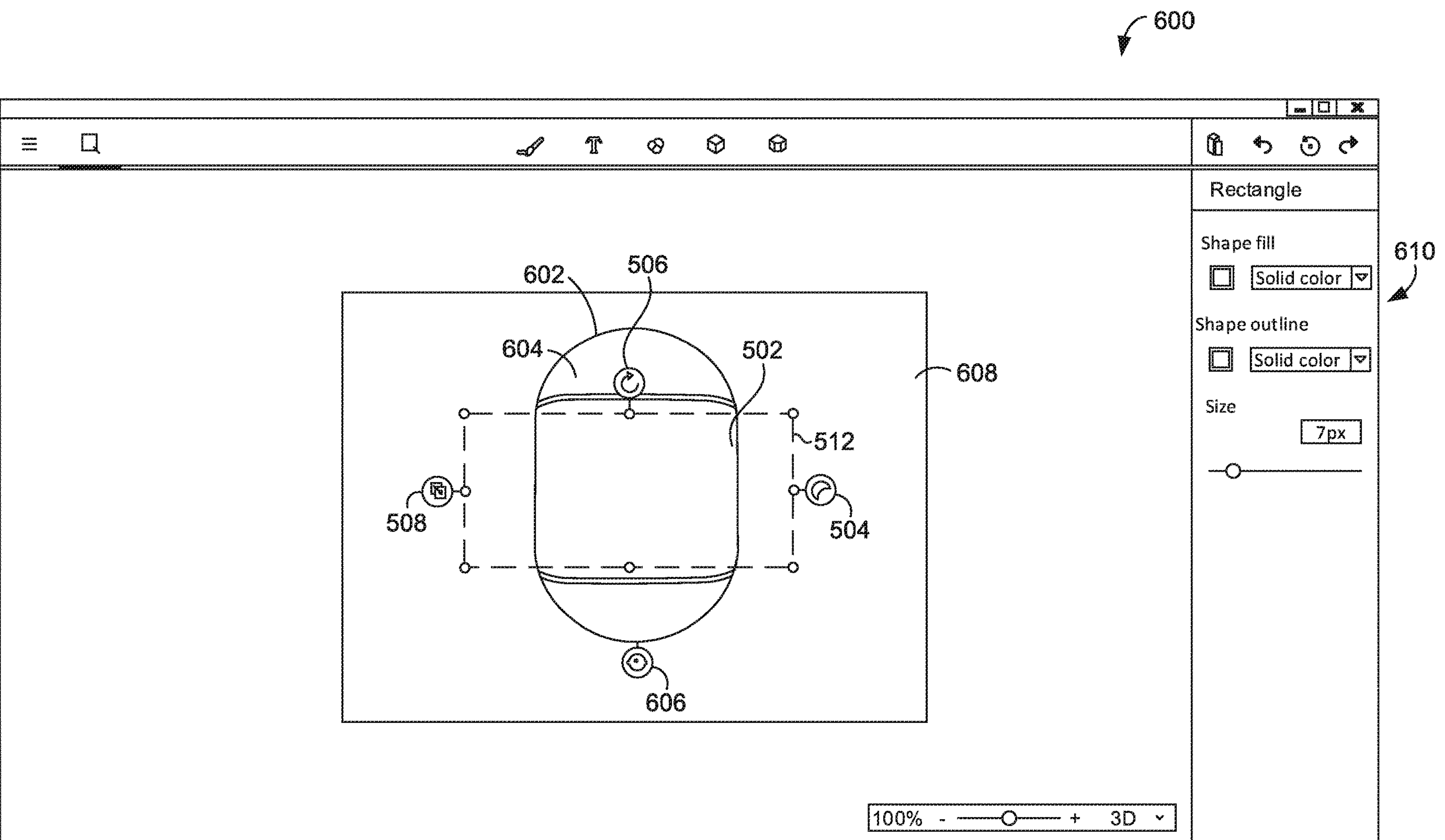
Figure 13:
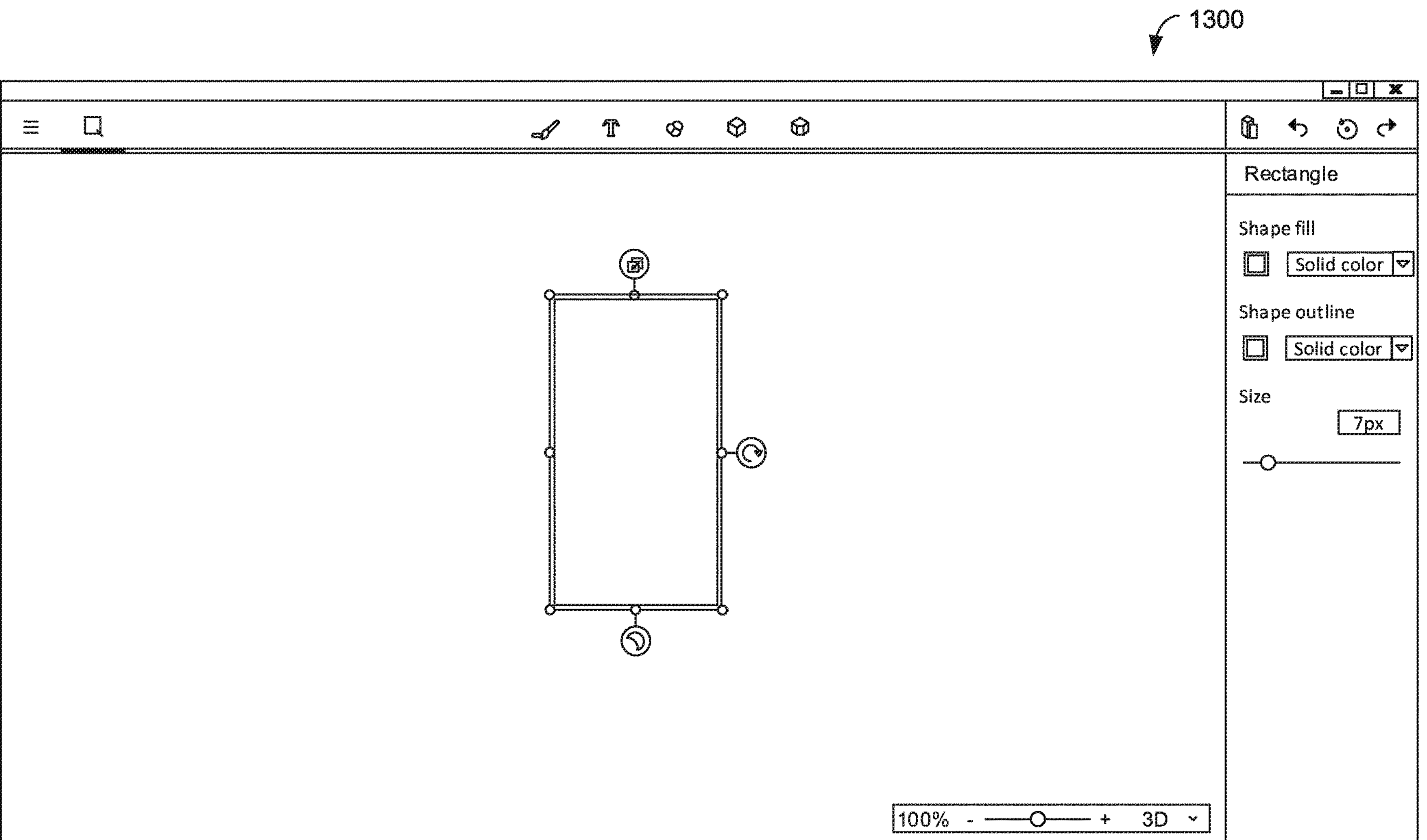

The exemplary user interface 500 of FIG. 5 includes a 2D image 502 and a toolbar 510. Upon selection of the 2D image 502, a bounding box 512 and three control handles may be provided for presentation. The bounding box 512 surrounds the image 502. In this example, the bounding box includes three control handles. Control handle 506 is used to rotate the image 502 in a clockwise or counterclockwise direction about a z-axis. For example, the view 1300 of FIG. 13 shows the image 502 after it has been rotated 90° using control handle 506.

Control handle 504 is associated with a "Sticker Object" command. As discussed above, the "Sticker Object" command causes a 2D image to be converted to a sticker template, which may then be stamped or otherwise applied to a canvas or another object in the 3D drawing space.

Control handle 508 is associated with a "Make Object" command. As discussed above, the "Make Object" command causes a 2D image to be turned into an object, such as a 2D object or a 3D object.

In some instances, these control handles for the "Make Object" and "Sticker Object" commands are provided for presentation upon the selection of any 2D image, including shapes, imported images, portions of cropped images, textures, and other objects and 2D content. In this way, all 2D images may be used as a sticker template. If a user selects the 2D image 502 and then deselects the 2D image 502 (e.g., by clicking off the image 502 or by selecting a different tool), a default action may be implemented. In some instances, the default action may be rasterizing the 2D image 502 to the canvas in the virtual 3D drawing space. Thus, the 2D image 502 remains a real, non-transient feature in the virtual 3D drawing space.

The configurations discussed above are exemplary only. In other examples, these features (e.g., the "Make Object" and "Sticker Object" command) may be associated with other user interface features, such as icons included in the toolbar 510, additional and/or different control handles, or other means.

The bounding box 512 may also be used to resize the image 502. For example, the bounding box may be used to increase or decrease the size of the image 502 in any direction. The image 502 may be resized proportionately (i.e. it may retain its original proportions) or disproportionately (i.e. it may be stretched further in one direction, such as the x direction, than in another direction, such as the y direction).

In some instances, a 2D image may be created in a virtual 2D drawing space (e.g., a drawing space that includes only a canvas and 2D images). In this instance, a user selection of the "Sticker Object" command may cause the shape to be rasterized to the canvas or background. In some instances, an animation effect may indicate the transferal of the image to the canvas (e.g., the "sticking" or "stamping" of the image to the canvas), thus signaling to the user that the transfer has occurred. A user selection of the "Make Object" command may cause the shape to be turned into a 2D object (e.g., rasterized to a floating quad). If a user deselects the 2D image, a default action may be implemented. In one example, the default action may be rasterizing the image to the canvas. Again, an animation effect may indicate the transferal of the image to the canvas.

In other instances, a 2D image may be created in a virtual 3D drawing space (e.g., a drawing space that includes 3D content). For example, the user interface 600 of FIG. 6 includes a canvas 608 and a 3D object 602 having a surface 604. The 2D image 502 of FIG. 5 has been dragged over the 3D object 602. The image 502 appears as a sticker template. It is projected in 3D space onto the surface 604 of the object 602. It wraps around the surface 604 of the object 602. The bounding box 512 and the accompanying control handles are visible, allowing a user to manipulate the 2D image 502 prior to applying (e.g., "sticking" or "stamping") the 2D image onto the 3D object. Control handle 606 facilitates the manipulation of the object 602 in 3D space. The control handle 606 may be used to rotate the object 602 around multiple different axes. For example, the control handle 606 may serve as a single input mechanism for rotating the object 602 around the x-, y-, and/or z-axis. The toolbar 610 provides additional features for interacting with the virtual drawing space.

Figure 7:
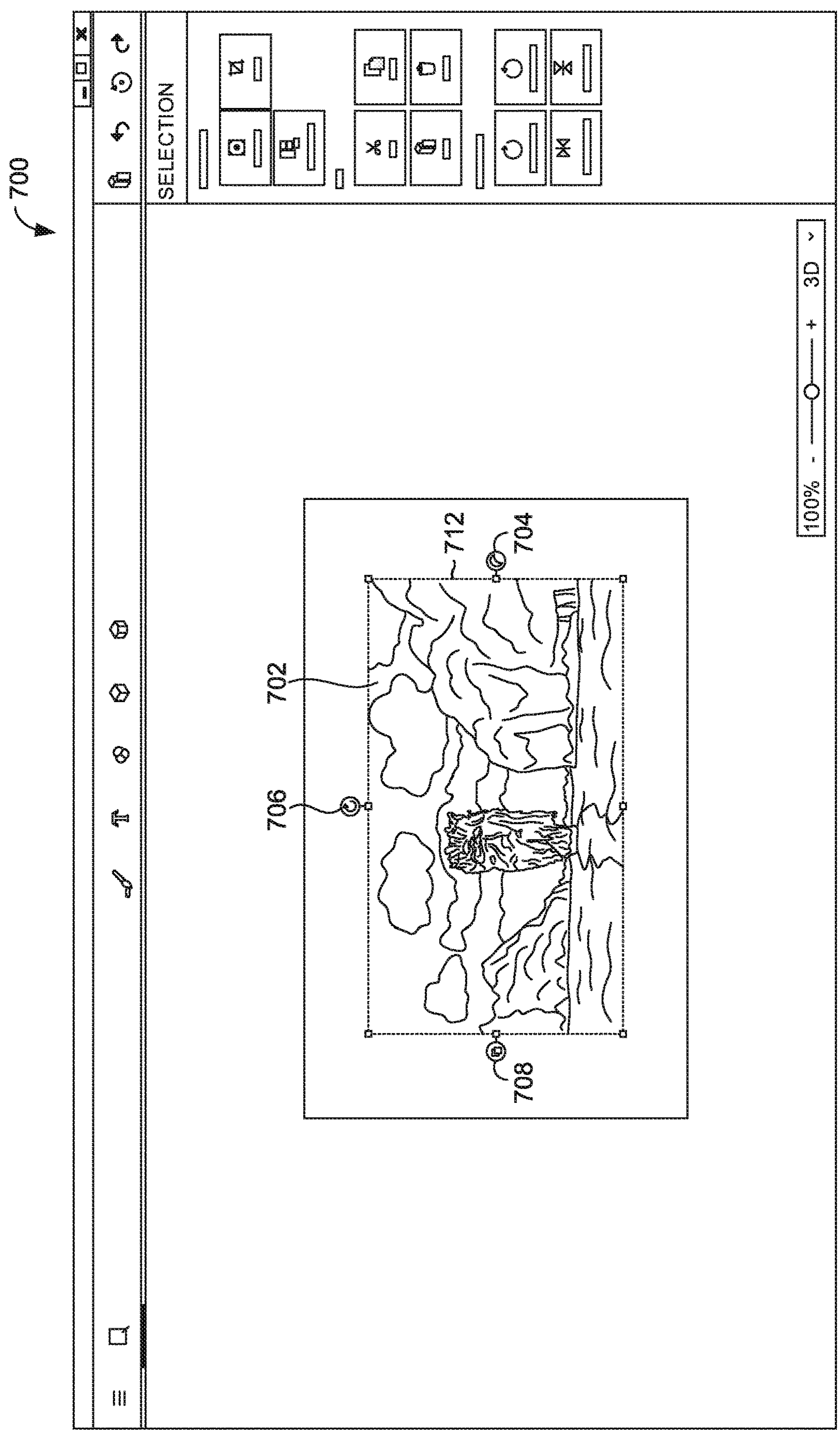

As mentioned, any 2D image may serve as a sticker template. The exemplary user interface 700 of FIG. 7 shows a 2D image 702 comprising a picture or a photograph. In one example, this picture may have been imported to the drawing space by the user for the purpose of creating a sticker to be applied to 3D objects. In another example, this picture may have previously been applied to the canvas (e.g., as a sticker); the user may drag out the picture from the canvas, and upon doing so, the picture may become a 2D sticker template having a bounding box and control handles, such as the various control handles discussed above. As shown in FIG. 7, upon selection of the 2D image 702, a bounding box 712 and three control handles may be provided for presentation. The bounding box 712 and the three control handles 704, 706, and 708 may provide functionality similar to that discussed above with respect to the bounding box 512 and the control handles 504, 506, and 508, respectively. A discussion of that functionality is not repeated here.

Figure 8:
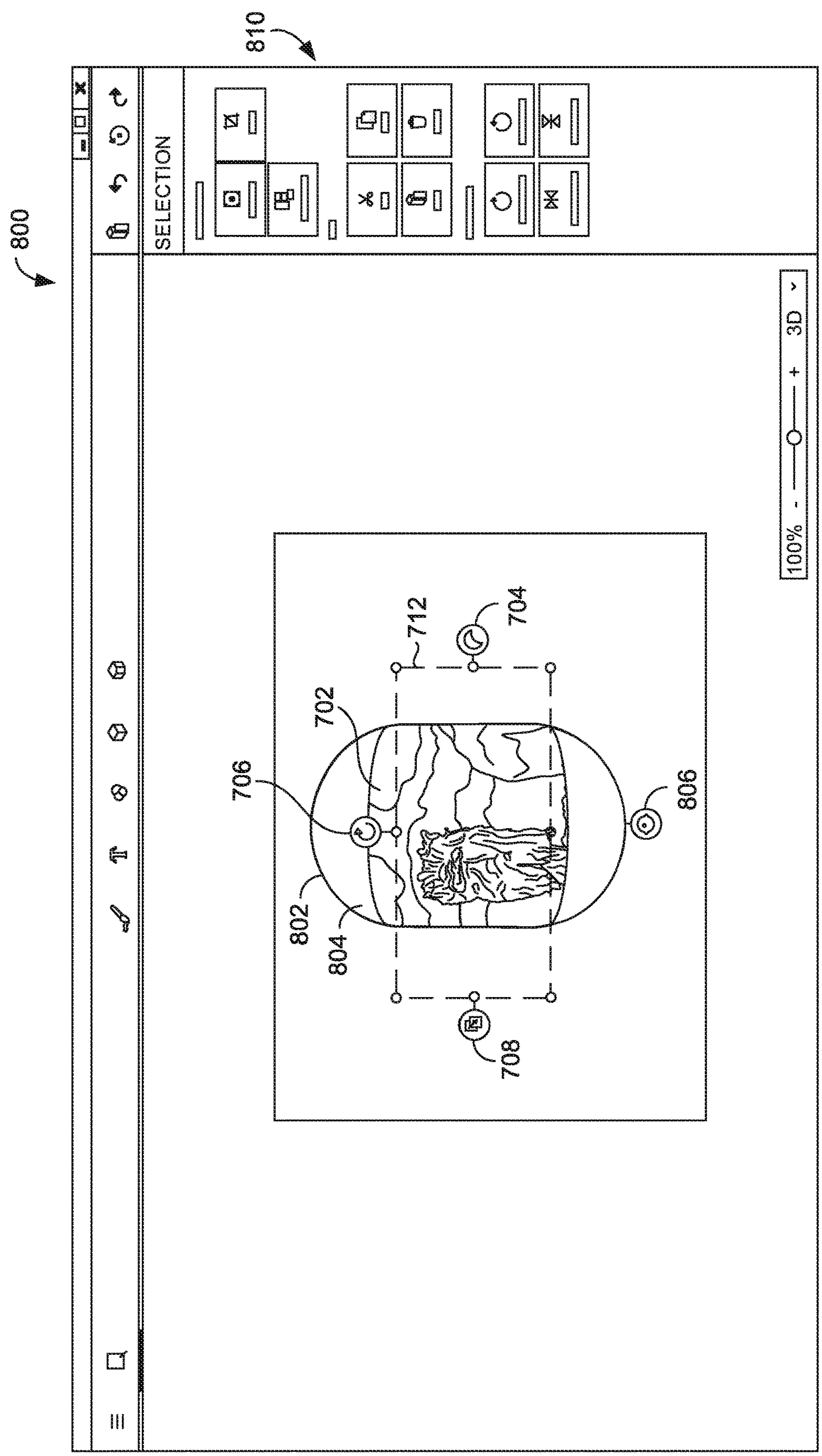
Figure 9:
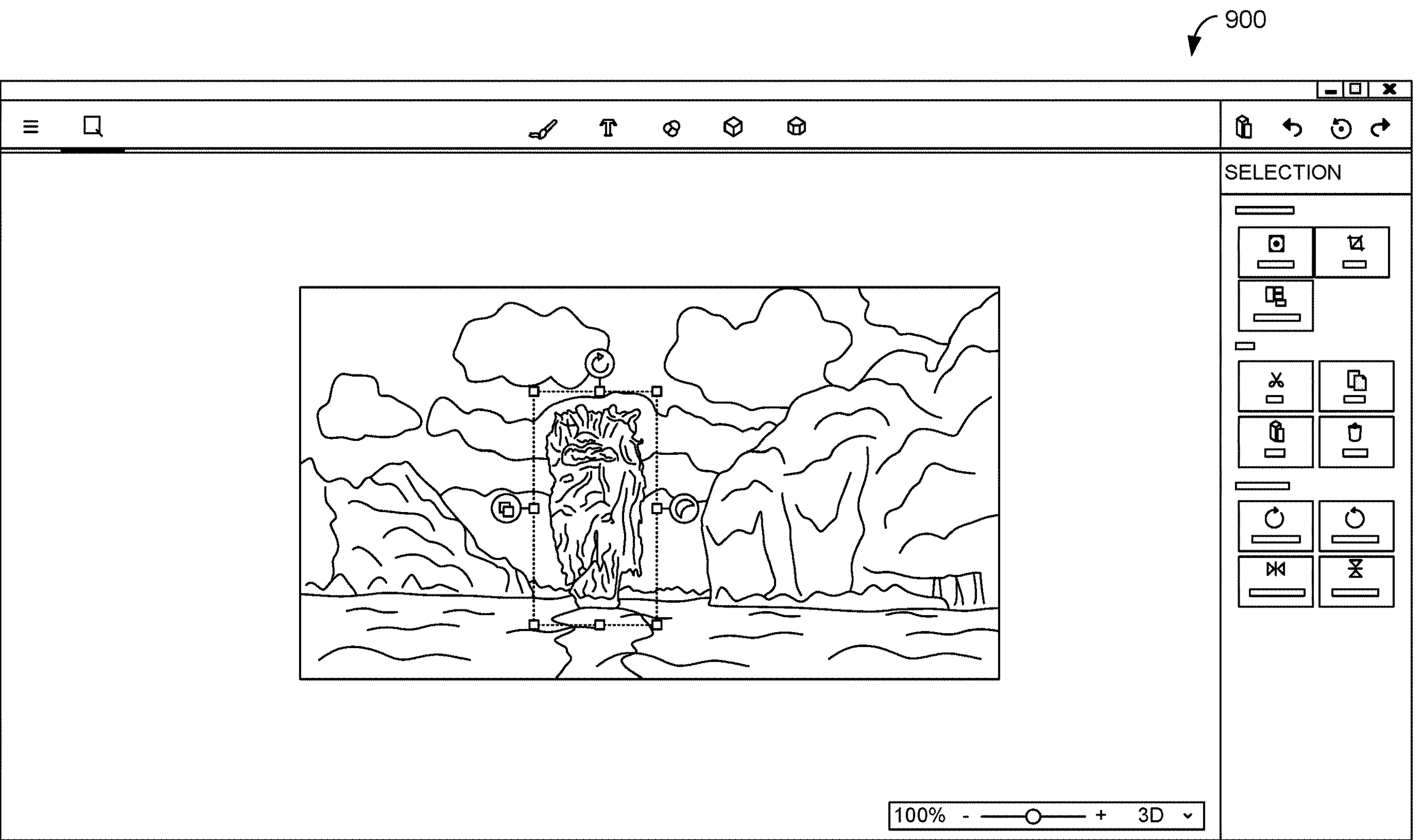

Turning now to FIG. 8, the exemplary user interface 800 shows the 2D image 702 of FIG. 7 projected onto the surface 804 of the 3D object 802. The control handle 806 may provide functionality similar to that discussed above with respect to the control handle 606. A discussion of that functionality is not repeated here. The toolbar 810 provides additional features for interacting with the virtual drawing space.

Figure 10:
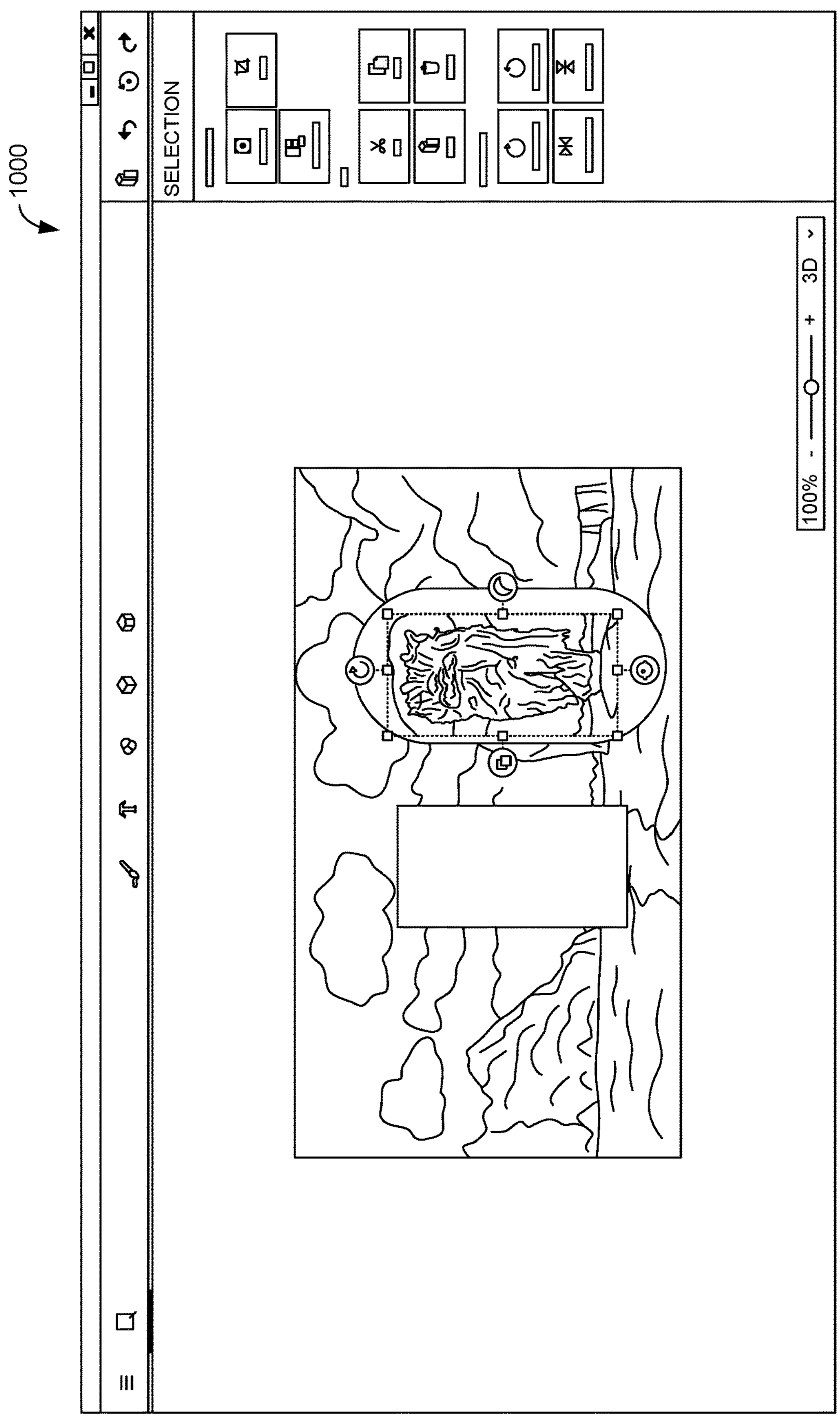

The exemplary user interfaces 900 and 1000 of FIGS. 900 and 1000, respectively, illustrate the manner in which a selected portion of a 2D image may be used as a sticker template. For example, in FIG. 9, a portion of the image has been selected. In FIG. 10, the selected portion of the image has been projected onto a 3D object.

Figure 11:
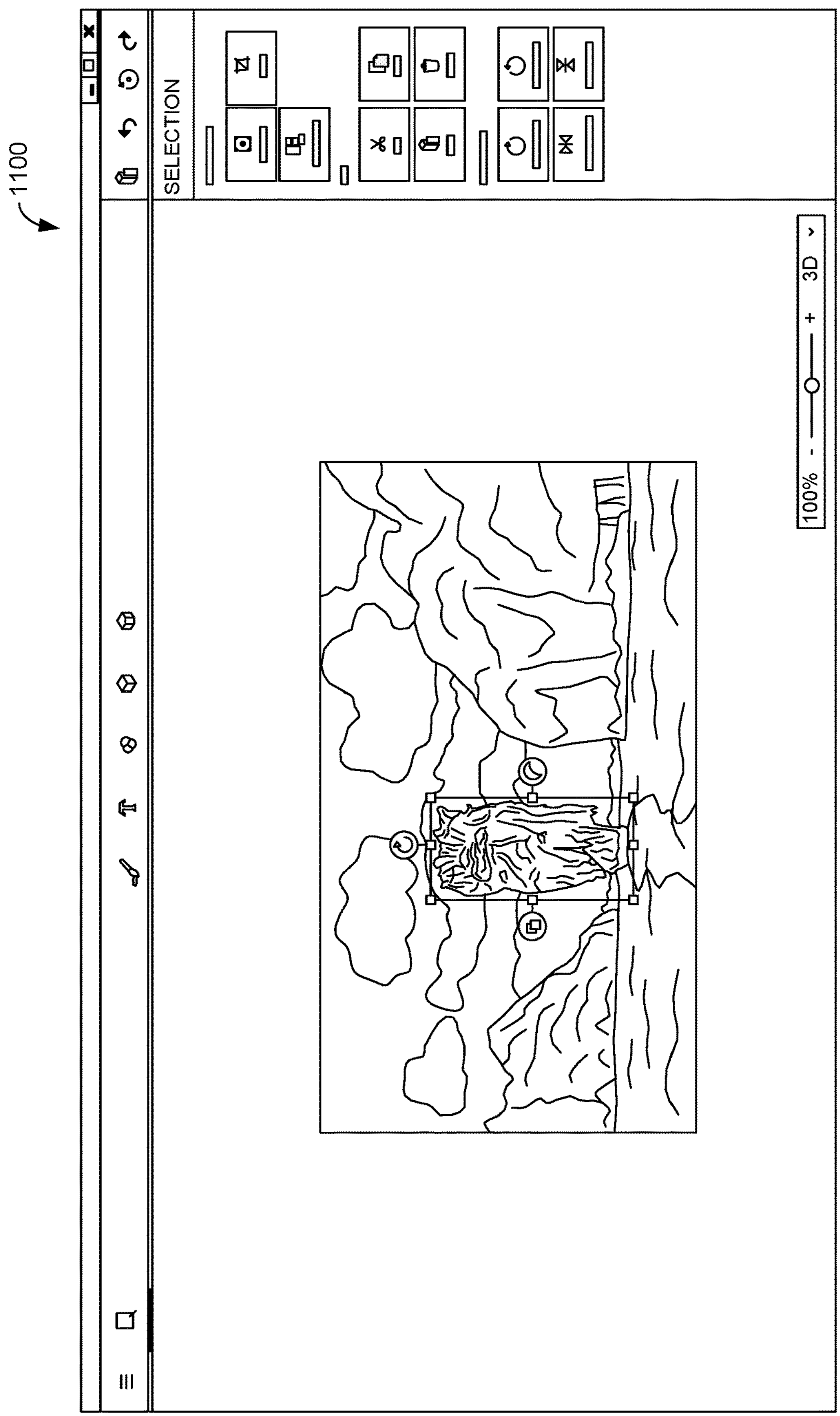
Figure 12:
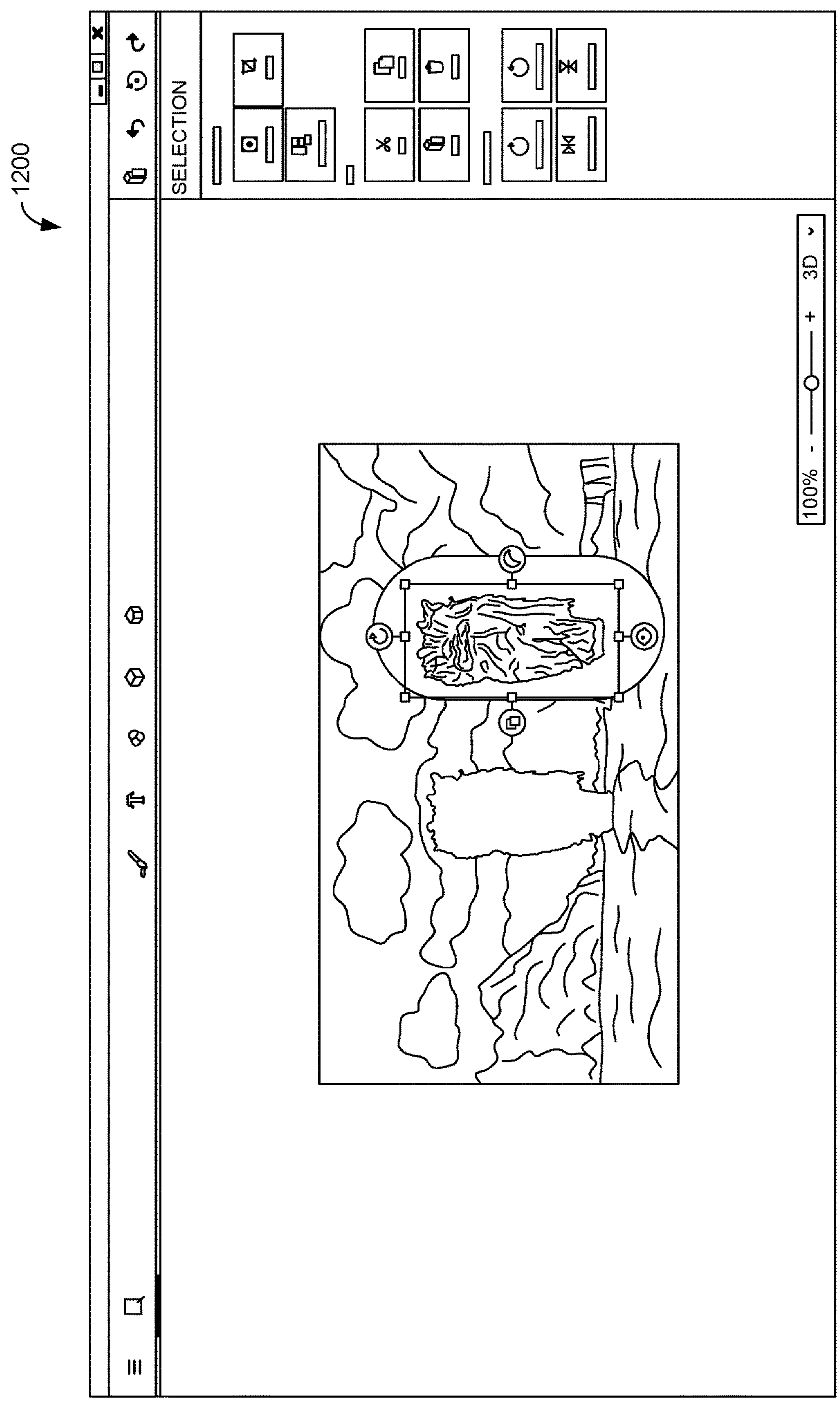

The exemplary user interfaces 1100 and 1200 of FIGS. 11 and 12, respectively, illustrate the manner in which a "smart select" feature may be used to extract a particular element from 2D content and turn that extracted content into a sticker template. Specifically, in FIG. 11, a smart select operation has been performed on a portion of a 2D image. The 2D content that is extracted by the smart select operation is available as a sticker template and, in FIG. 12, has been projected onto a 3D object included in the virtual drawing space. The remaining content from the 2D image may be rasterized in place on the canvas. In some instances, a user may have the opportunity to correct and/or refine the selection of a portion of a 2D image. In one example, this correction and/or refinement is completed prior to the user moving the selected portion away from the remainder of the image.

Figure 14:
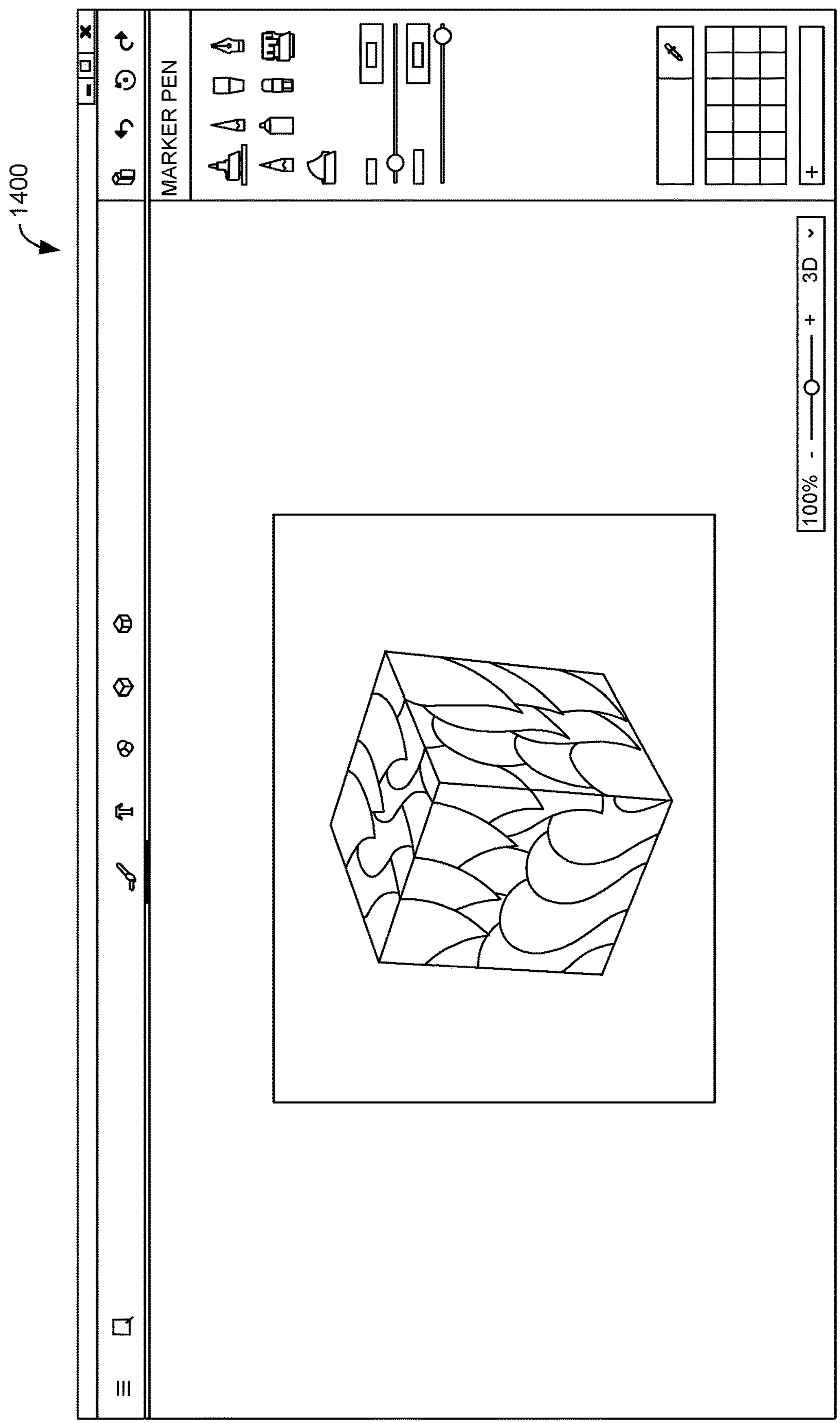

The exemplary user interface 1400 of FIG. 14 illustrates a 3D object having multiple overlapping instances of the same sticker. In one example, a user may achieve this effect by holding down the "Shift" key while selecting the control handle associated with the "Sticker Object" command. However, it will be understood that in other examples, any key on a keyboard may be used to enable this functionality. Other means for achieving this effect may be provided for touchscreen devices or other devices without keyboards. This may have the effect of making the sticker template available for repeated use. Otherwise, in some examples, after the sticker has been applied, the template is no longer available for use.

Figure 15:
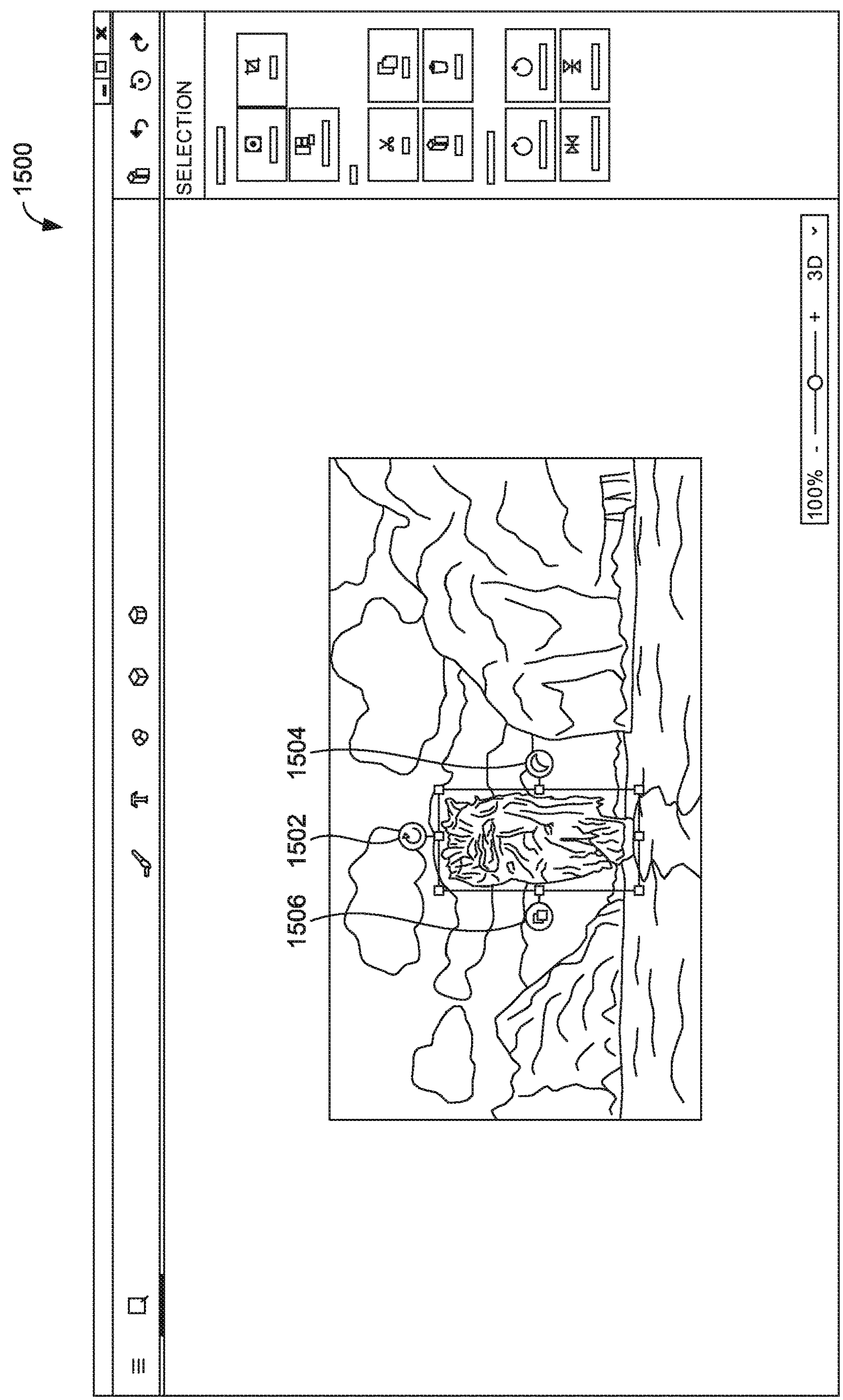

The exemplary user interfaces 1500, 1600, 1700, and 1800 of FIGS. 15, 16, 17, and 18, respectively, illustrate several different options for displaying control handles proximate to a selection of content in a drawing space. In FIG. 15, a portion of a 2D image has been selected, and the control handles 1502, 1504, and 1506, which may be similar to one or more of the control handles discussed above, are provided for presentation.

Figure 16:
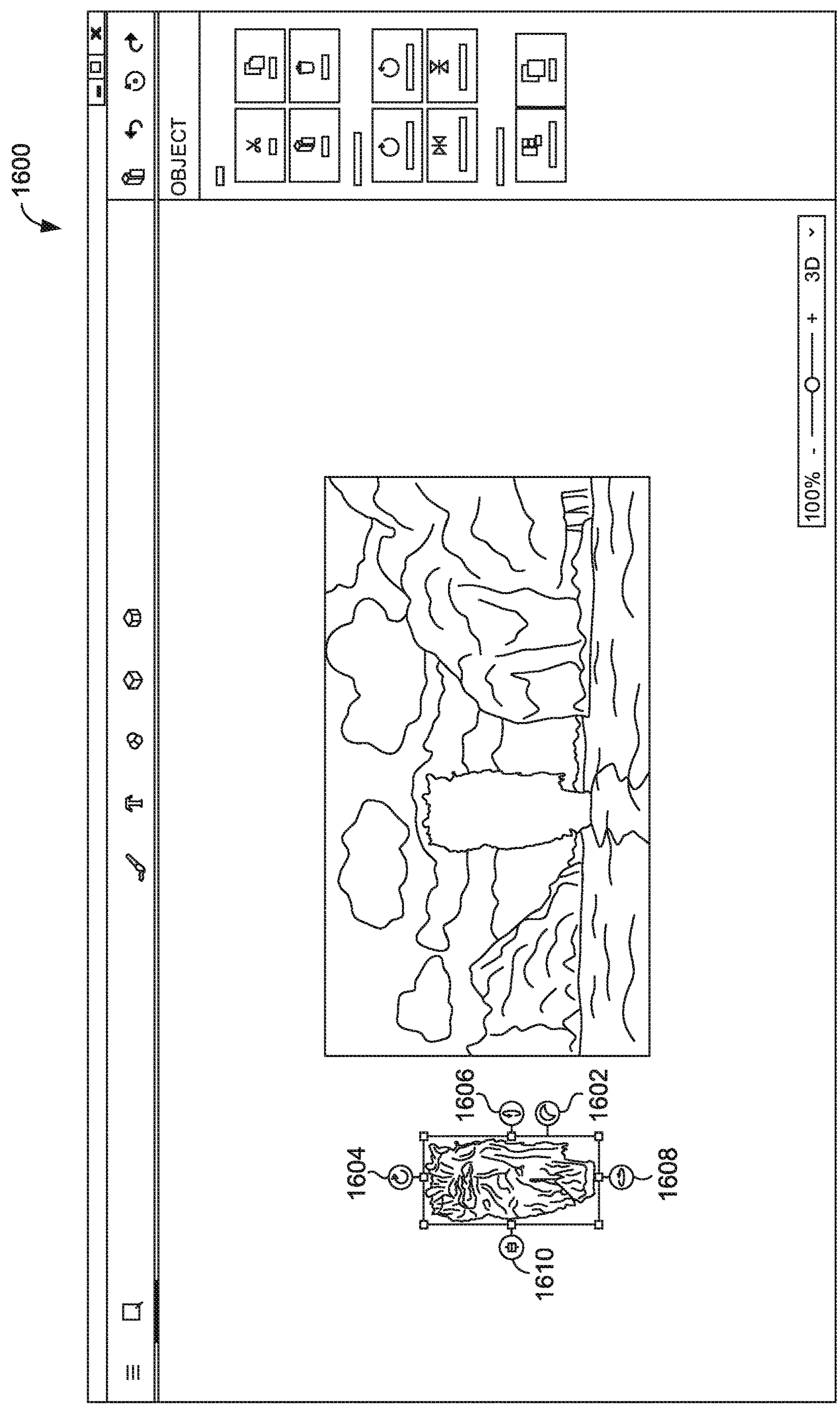
Figure 17:
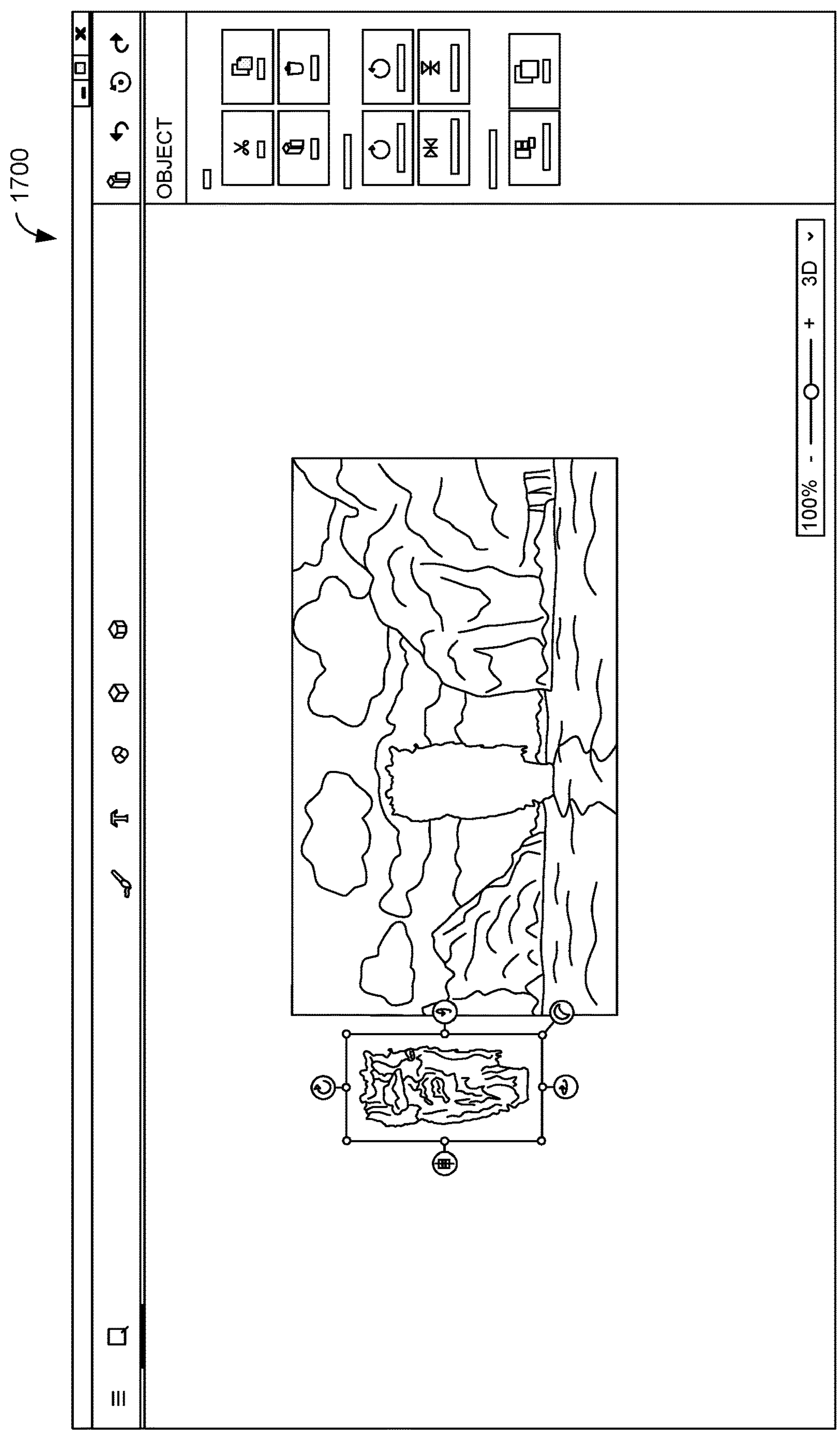

In FIG. 16, the extracted portion of the 2D image has been dragged to the left of the remainder of the image and the "Make Object" command has been selected. In some examples, the "Make Object" functionality is provided via a toolbar icon. After selection of the "Make Object" command, the selected content may become a flat 3D object. FIG. 16 illustrates three control handles for controlling the rotation of the image. These three control handles 1604, 1606, and 1608 provide features similar to those discussed with respect to control handles 104, 106, and 108, respectively. A discussion of this functionality is not repeated here. In FIG. 16, the control handles 1602 and 1610 are also presented and may be similar to the control handles discussed above for converting an object to a sticker template and for moving an object in the z direction, respectively. FIG. 17 illustrates an alternative arrangement for the same control handles included in FIG. 16.

Figure 18:
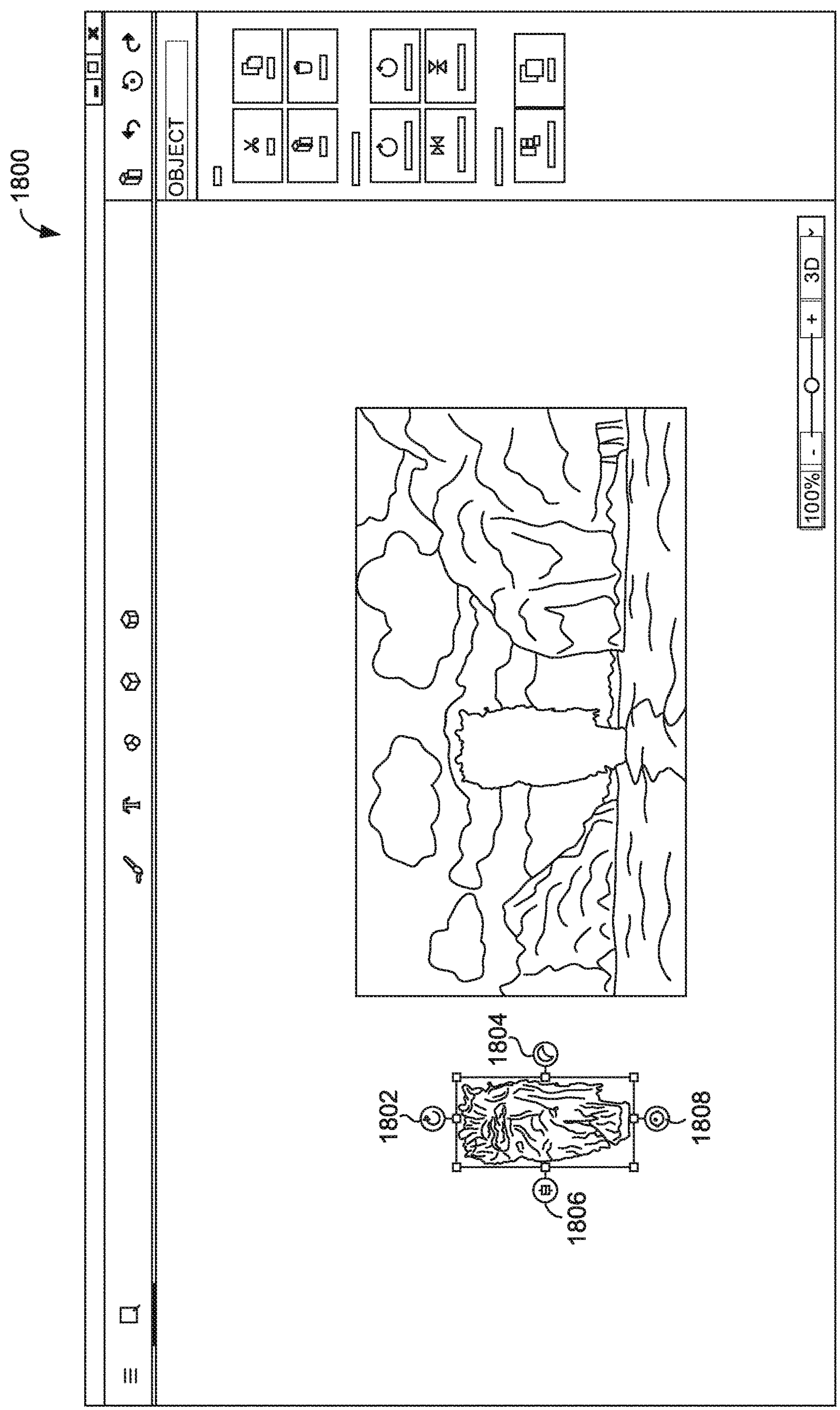

FIG. 18 illustrates yet another exemplary display of control handles proximate to the flat 3D object. Here, control handle 1802 provides for rotating the object around a z-axis, control handle 1804 is associated with a "Sticker Object" command, and control handle 1806 provides for moving the object in the z direction. Control handle 1808 may provide functionality similar to control handle 310 discussed above.

Regardless of the number and relative arrangement of control handles and toolbar icons included in the user interface for a virtual drawing space, the user interface may include a hover functionality that enables a user to tap, hover over, or otherwise indicate a particular control handle or toolbar icon in order to view a brief description of the control handle. For example, if a user hovers over the control handle associated with the "Sticker Object" command, the user interface may present a label that reads "Sticker Object" and/or may present a brief description of the functionality provided by the "Sticker Object" command. The exemplary arrangements of control handles and toolbar icons discussed herein and illustrated in the accompanying figures are not limiting. Additional arrangements are contemplated and included within the scope of the present disclosure.

Figure 19:
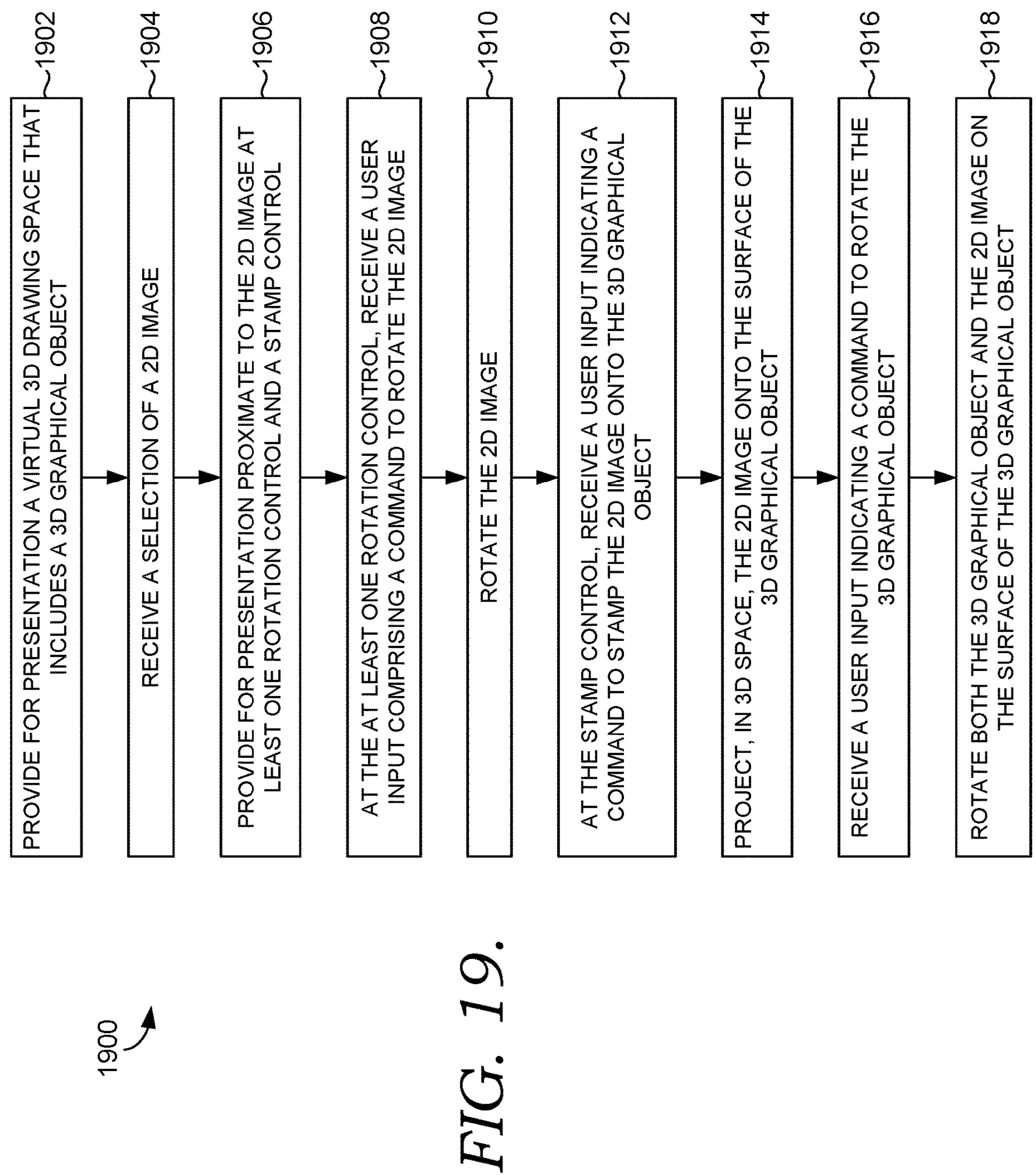
FIG. 19 depicts a flow diagram of a method for projecting a 2D image onto a surface of a 3D graphical object displayed in a virtual 3D drawing space generated by a computer, in accordance with aspects of the present disclosure.

Turning now to FIG. 19, a flow diagram of a method 1900 for projecting a 2D image onto a surface of a 3D graphical object is depicted, in accordance with aspects of the present disclosure. Method 1900 could be performed by a computing device, such as computing device 2000 illustrated in FIG. 20. The computing device can take the form of a laptop computer, a personal computer with detached display, a tablet computer, a smart phone, a holographic display, a virtual reality headset, an augmented reality headset, or some combination of the above or similar devices.

At step 1902, a virtual 3D drawing space is provided for presentation. This may include generating the 3D drawing space (e.g., by a computer application) and outputting the drawing space for display. The virtual 3D drawing space may be displayed in 3D, using stereoscopic technology, or other techniques that provide a three-dimensional appearance to the display. The virtual 3D drawing space can also be displayed in 2D with various camera angles used to depict the 3D space. The 3D drawing space includes a 3D graphical object.

At step 1904, a selection of a 2D image is received. The selection may occur when a user contacts the 2D image with a cursor. The cursor may be controlled by a mouse, touchscreen input (e.g., stylus, finger), trackball, gaze detection, head movement, voice control, gestures, or other input techniques. In one aspect, the selection occurs when the cursor contacts the 2D image and a second input, such as a mouse click, is provided. As an alternative to a cursor, the 2D image may be selected via voice control, keyboard, or other mechanism. The 2D image may comprise user-provided content that was uploaded by a user to the virtual 3D drawing space. In some aspects, the 2D image is a cropped portion of user-provided content.

At step 1906, in response to the selection of the 2D image, at least one rotation control and a stamp control are provided for presentation proximate to the 2D image. For example, the controls may be displayed on or near a bounding box that borders the 2D image. In some aspects, only the at least one rotation control is provided for presentation, and in additional aspects, only the stamp control is provided for presentation. The rotation control may enable a user to rotate the 2D image to varying degrees in a clockwise or counter-clockwise direction. Thus, at step 1908, when a user input comprising a command to rotate the 2D image is received at the at least one rotation control, the 2D image is rotated in response in step 1910. In some aspects, the rotation control may provide the functionality provided by control handle 308 discussed with respect to FIG. 3.

At step 1912, a user input is received at the stamp control. The user input indicates a command to stamp the 2D image onto the 3D graphical object. The stamp control may provide the functionality provided by the control handle 306 discussed with respect to FIG. 3.

In response to the user input indicating the command to stamp the 2D image onto the 3D graphical object, the 2D image is projected, in 3D space, onto the surface of the 3D object. This creates the appearance that the 2D image wraps around the 3D object. In some aspects, prior to receiving the user input indicating the command to stamp the 2D image onto the 3D graphical object, a preview of the 2D image projected onto the surface of the 3D graphical object is provided for presentation. This preview may aid a user in determining where to stamp the 2D image within the 3D drawing space.

After the 2D image has been stamped or otherwise applied to the surface of the 3D graphical object, the 2D image may behave as if it is adhered to the surface of the 3D graphical object. For example, at step 1916, when a user input indicating a command to rotate the 3D graphical object is received, both the 3D graphical object and the 2D image on the surface of the 3D graphical object are rotated at step 1918. Throughout the rotation, the 2D image remains fixed to the surface of the 3D graphical object.

In some aspects, upon receiving the user input indicating the command to stamp the 2D image onto the surface of the 3D graphical object, the projection of the 2D image onto the 3D graphical object is locked. Locking the projection of the 2D image onto the 3D graphical object may prevent a user from rotating or resizing the 2D image independently of rotating or resizing the 3D graphical object. In additional aspects, the projection of the 2D image onto the 3D graphical object is not locked. In such aspects, when a selection of the 2D image is received subsequent to receiving the user input indicating the command to stamp the 2D image onto the surface of the 3D graphical object, at least one rotation control is provided for presentation proximate to the 2D image. Then, in response to a user input comprising a command to rotate the 2D image, the 2D image is rotated independently of the 3D graphical object.

In one example, upon selection of the 3D graphical object, an x-axis control, a y-axis control, and a z-axis control are provided for presentation. In response to receiving an input through the x-axis control, the 3D graphical object and the 2D image on the surface of the 3D graphical object are rotated around an x-axis. Similarly, in response to receiving an input through the y-axis control, the 3D graphical object and the 2D image on the surface of the 3D graphical object are rotated around a y-axis. Finally, in response to receiving an input through the z-axis control, the 3D graphical object and the 2D image on the surface of the 3D graphical object are rotated around a z-axis.

In another example, upon selection of the 3D graphical object, a bounding box is provided for presentation proximate to the 3D graphical object. The bounding box includes size controls that increase or decrease a size of the 3D graphical object. A user input indicating a command to increase (or decrease) the size of the 3D object may be received at the size controls. In response, the size of the 3D graphical object and the 2D image on the surface of the 3D graphical object may be increased (or decreased). Throughout the resizing, the 2D image remains fixed to the surface of the 3D graphical object.

Figure 20:
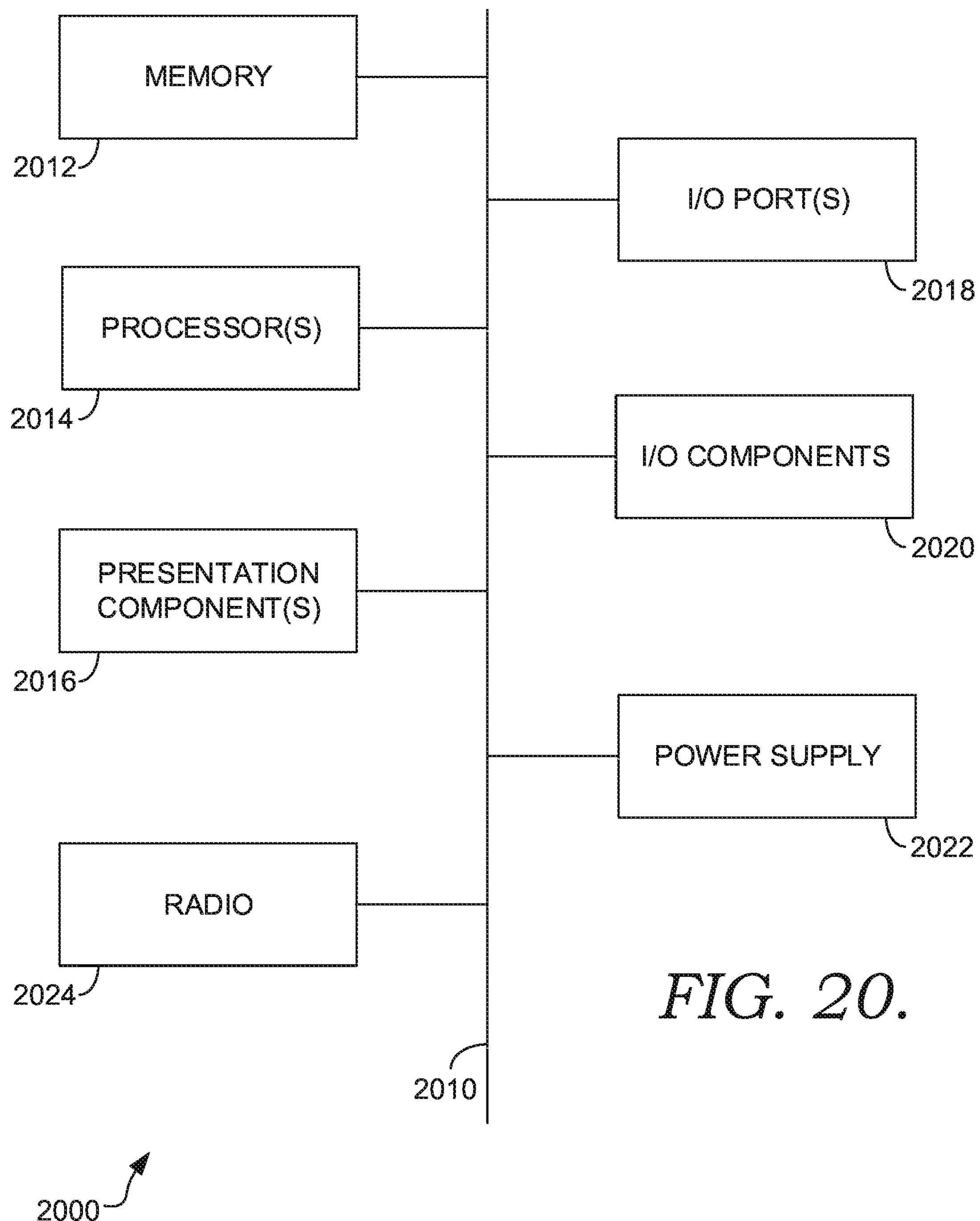
FIG. 20 is a block diagram of an exemplary computing environment suitable for use in implementing an aspect of the present disclosure.

Having described various implementations, an exemplary computing environment suitable for implementing aspects of the disclosure is now described. With reference to FIG. 20, an exemplary computing device is provided and referred to generally as computing device 2000. The computing device 2000 is but one example of a suitable computing environment and is not intended to suggest any limitation as to the scope of use or functionality of aspects of the disclosure. Neither should the computing device 2000 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 20, computing device 2000 includes a bus 2010 that directly or indirectly couples the following devices: memory 2012, one or more processors 2014, one or more presentation components 2016, one or more input/output (I/O) ports 2018, one or more I/O components 2020, and an illustrative power supply 2022. Bus 2010 represents what may be one or more busses (such as an address bus, data bus, or combination thereof). Although the various blocks of FIG. 20 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 20 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 20 and with reference to "computing device."

Computing device 2000 typically includes a variety of computer-readable media. Computer-readable media can be any available media that can be accessed by computing device 2000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 2000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 2012 includes computer storage media in the form of volatile and/or nonvolatile memory. The memory may be removable, non-removable, or a combination thereof. Exemplary hardware devices include solid-state memory, hard drives, optical-disc drives, etc. Computing device 2000 includes one or more processors 2014 that read data from various entities such as memory 2012 or I/O components 2020. Presentation component(s) 2016 presents data indications to a user or other device. Exemplary presentation components include a display device, speaker, printing component, vibrating component, and the like.

The I/O ports 2018 allow computing device 2000 to be logically coupled to other devices, including I/O components 2020, some of which may be built in. Illustrative components include a microphone, joystick, game pad, satellite dish, scanner, printer, wireless device, etc. The I/O components 2020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 2000. The computing device 2000 may be equipped with depth cameras, such as stereoscopic camera systems, infrared camera systems, RGB camera systems, and combinations of these, for gesture detection and recognition. Additionally, the computing device 2000 may be equipped with accelerometers or gyroscopes that enable detection of motion. The output of the accelerometers or gyroscopes may be provided to the display of the computing device 2000 to render immersive augmented reality or virtual reality.

Some aspects of computing device 2000 may include one or more radio(s) 2024 (or similar wireless communication components). The radio 2024 transmits and receives radio or wireless communications. The computing device 2000 may be a wireless terminal adapted to receive communications and media over various wireless networks. Computing device 2000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of projecting at least a portion of a two-dimensional (2D) image onto a surface of a three-dimensional (3D) graphical object displayed in a virtual 3D drawing space generated by a computer, the method comprising:

providing for presentation the virtual 3D drawing space, the virtual 3D drawing space comprising the 2D image and the 3D graphical object;

receiving a user input indicating a command to extract a graphical element comprising a portion of the 2D image;

in response to the user input indicating the command to extract the graphical element, automatically extracting the graphical element from the 2D image;

providing for presentation proximate to the graphical element a bounding box, the bounding box bounding the graphical element and comprising a sticker control, wherein a description of the sticker control is provided in response to a user input indicating the sticker control;

at the sticker control, receiving a user input indicating a command to convert the graphical element into a sticker and, in response, converting the graphical element into the sticker;

at a stamp control, receiving a user input indicating a command to stamp the sticker onto the 3D graphical object; and in response to the user input indicating the command to stamp the sticker onto the 3D graphical object, projecting, in 3D space, the sticker onto the surface of the 3D graphical object.

2. The method of claim 1, further comprising:

receiving a user input indicating a command to rotate the 3D graphical object; and in response to the user input indicating the command to rotate the 3D graphical object, rotating both the 3D graphical object and the sticker on the surface of the 3D graphical object, wherein throughout the rotation, the sticker remains fixed to the surface of the 3D graphical object.

3. The method of claim 1, wherein upon selection of the 3D graphical object, an x-axis control, a y-axis control, and a z-axis control are provided for presentation.

4. The method of claim 3, further comprising:

receiving an input through the x-axis control;

in response to the input, rotating the 3D graphical object and the sticker on the surface of the 3D graphical object around an x-axis;

receiving an input through the y-axis control;

in response to the input, rotating the 3D graphical object and the sticker on the surface of the 3D graphical object around a y-axis;

receiving an input through the z-axis control; and in response to the input, rotating the 3D graphical object and the sticker on the surface of the 3D graphical object around a z-axis.

5. The method of claim 1, wherein upon selection of the 3D graphical object, size controls are provided for presentation proximate to the 3D graphical object, wherein the size controls increase or decrease a size of the 3D graphical object.

6. The method of claim 5, wherein the method further comprises: in response to a user input received at the size controls, the user input indicating a command to increase the size of the 3D graphical object, increasing the size of the 3D graphical object and the sticker on the surface of the 3D graphical object, wherein throughout the size increase, the sticker remains fixed to the surface of the 3D graphical object.

7. A computer system comprising:

one or more processors; and one or more computer storage media storing computer-executable instructions that, when executed by the one or more processors, are configured to implement a method comprising:

providing for presentation a virtual three-dimensional (3D) drawing space, the virtual 3D drawing space comprising a two-dimensional (2D) image, providing for presentation proximate to the 2D image a bounding box, the bounding box bounding the 2D image and comprising a sticker control, at the sticker control, receiving a user input indicating a command to convert at least a portion of the 2D image into a sticker and, in response, converting the at least the portion of the 2D image into the sticker, at a stamp control, receiving a user input indicating a command to stamp the sticker onto a surface of a 3D graphical object in the 3D drawing space, and in response to the user input indicating the command to stamp the sticker onto the 3D graphical object, projecting, in 3D space, the sticker onto the surface of the 3D graphical object.

8. The computer system of claim 7, wherein the method further comprises providing for presentation a preview of the sticker projected onto the surface of the 3D graphical object prior to receiving the user input indicating the command to stamp the sticker onto the surface of the 3D graphical object.

9. The computer system of claim 7, wherein upon receiving the user input indicating the command to stamp the sticker onto the surface of the 3D graphical object, the projection of the sticker onto the 3D graphical object is locked.

10. The computer system of claim 9, wherein locking the projection of the sticker onto the 3D graphical object prevents a user from rotating or resizing the sticker independently of rotating or resizing the 3D graphical object.

11. The computer system of claim 7, wherein the method further comprises:

subsequent to receiving the user input indicating the command to stamp the sticker onto the surface of the 3D graphical object, receiving a selection of the sticker;

in response to the selection of the sticker, providing for presentation proximate to the sticker at least one rotation control; and at the at least one rotation control, receiving a user input comprising a command to rotate the sticker and, in response, rotating the sticker independently of the 3D graphical object.

12. The computer system of claim 7, wherein the method further comprises:

receiving a user input indicating a command to rotate the 3D graphical object; and in response to the user input indicating the command to rotate the 3D graphical object, rotating both the 3D graphical object and the sticker on the surface of the 3D graphical object, wherein throughout the rotation, the sticker remains fixed to the surface of the 3D graphical object.

13. The computer system of claim 7, wherein in response to a user input received at a size control, the user input indicating a command to increase a size of the 3D graphical object, increasing the size of the 3D graphical object and the sticker on the surface of the 3D graphical object, wherein throughout the size increase, the sticker remains fixed to the surface of the 3D graphical object.

14. The computer system of claim 7, wherein the method further comprises:

receiving a user input indicating a selection of a portion of the 2D image and a command to convert the selected portion into an object; and in response to the user input, converting the selected portion into at least one of a 2D object or a flat 3D object, a shape of the object corresponding to a shape of the selected portion of the 2D image.

15. One or more computer storage media having computer-executable instructions embodied thereon that, when executed by a computing device having a processor and a memory, cause the computing device to perform a method for projecting at least a portion of a two-dimensional (2D) image onto a surface of a three-dimensional (3D) graphical object displayed in a virtual 3D drawing space generated by a computer, the method comprising:

at the processor of the computing device, providing for presentation the virtual 3D drawing space, the virtual 3D drawing space comprising the 2D image;

receiving a user input indicating a command to extract a graphical element comprising a portion of the 2D image;

in response to the user input indicating the command to extract the graphical element, automatically extracting the graphical element from the 2D image;

providing for presentation proximate to the graphical element a bounding box, the bounding box bounding the graphical element and comprising at least one rotation control and a sticker control;

at the at least one rotation control, receiving a user input comprising a command to rotate the graphical element and, in response, rotating the graphical element;

at the sticker control, receiving a user input indicating a command to convert the graphical element into a sticker and, in response, converting the graphical element into the sticker;

at a stamp control, receiving a user input indicating a command to stamp the sticker onto the 3D graphical object; and in response to the user input indicating the command to stamp the sticker onto the 3D graphical object, projecting, in 3D space, the sticker onto the surface of the 3D graphical object.

16. The one or more computer storage media of claim 15, wherein the method further comprises:

receiving a user input indicating a command to rotate the 3D graphical object; and in response to the user input indicating the command to rotate the 3D graphical object, rotating both the 3D graphical object and the sticker on the surface of the 3D graphical object, wherein throughout the rotation, the sticker remains fixed to the surface of the 3D graphical object.

17. The one or more computer storage media of claim 15, wherein in response to a user input received at a size control, the user input indicating a command to increase a size of the 3D graphical object, increasing the size of the 3D graphical object and the sticker on the surface of the 3D graphical object, wherein throughout the size increase, the sticker remains fixed to the surface of the 3D graphical object.

18. The one or more computer storage media of claim 15, wherein projecting, in 3D space, the sticker onto the surface of the 3D graphical object creates an appearance that the sticker wraps around the 3D graphical object in 3D space.

19. The one or more computer storage media of claim 15, wherein upon receiving the user input indicating the command to stamp the sticker onto the surface of the 3D graphical object, the projection of the sticker onto the 3D graphical object is locked, wherein locking the projection of the sticker onto the 3D graphical object prevents a user from rotating or resizing the sticker independently of rotating or resizing the 3D graphical object.

20. The one or more computer storage media of claim 15, wherein converting the graphical element into the sticker comprises converting the graphical element into a sticker template that is available for repeated use.

* * * * *